Nov. 16, 1965 G. H. BALDING 3,218,637

INFORMATION STORAGE AND CONVERSION APPARATUS

Filed Dec. 7, 1962 3 Sheets-Sheet 1

HORZ. GATE
40f
42
VIDEO OUT
TO COND. 35 (FIG. 1)
41c
b
VERT. GATE
c
RANGE GATE
a
38
36
37
VIDEO IN
43
ERASE

*INVENTOR.*
GEORGE H. BALDING

BY *Brown, Jackson, Boettcher & Dienner*

ATTYS.

INFORMATION STORAGE AND CONVERSION APPARATUS

Filed Dec. 7, 1962 3 Sheets-Sheet 2

INVENTOR.
GEORGE H. BALDING

BY Bunn Judson Boettcher & Dunner

ATTYS.

INFORMATION STORAGE AND CONVERSION APPARATUS
Filed Dec. 7, 1962 3 Sheets-Sheet 3
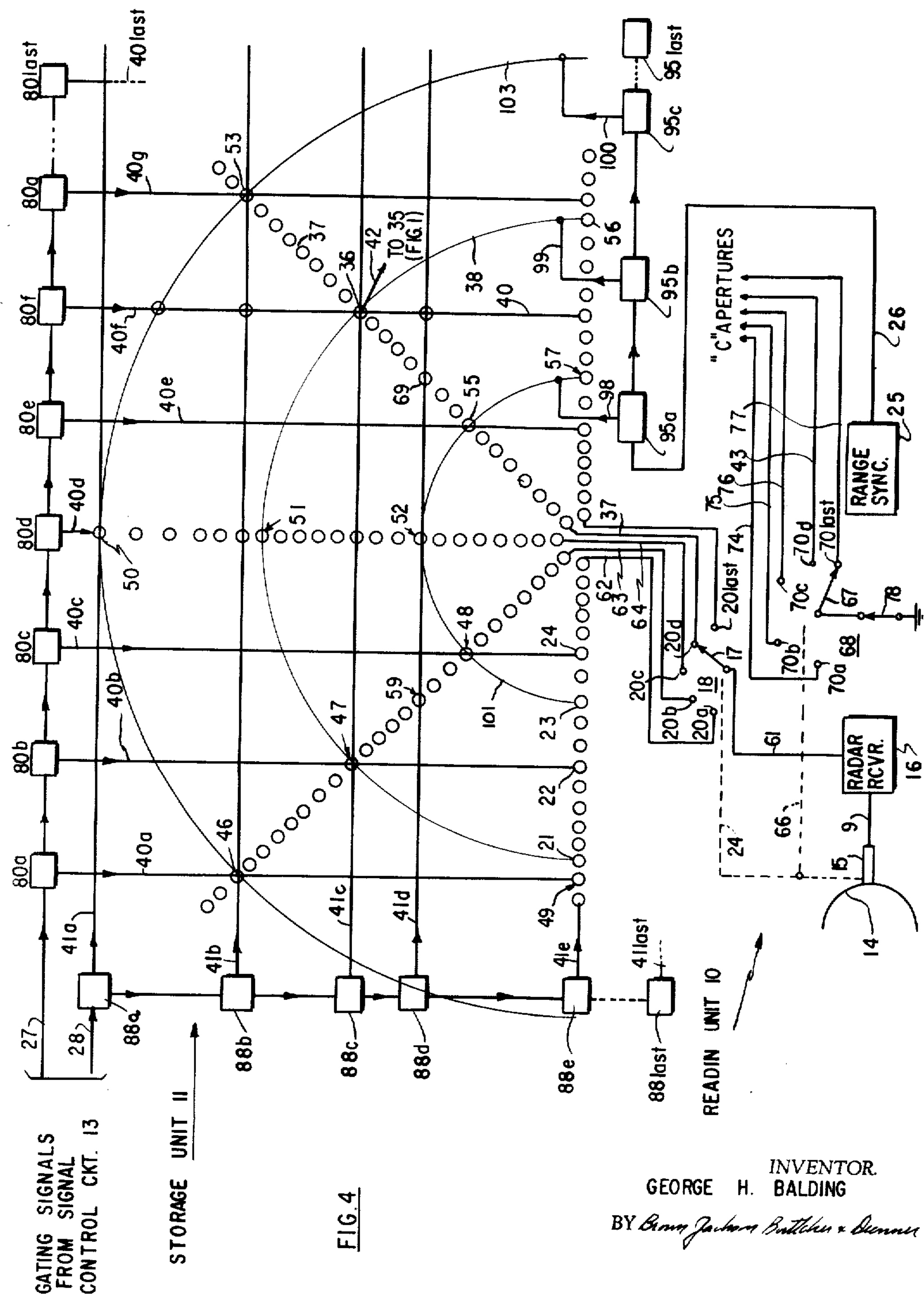
INVENTOR.
GEORGE H. BALDING
BY Brown, Jackson, Boettcher & Dienner
ATTYS.

United States Patent Office 3,218,637

Patented Nov. 16, 1965

3,218,637

INFORMATION STORAGE AND CONVERSION APPARATUS

George H. Balding, Fremont, Calif., assignor, by mesne assignments, to Kaiser Aerospace & Electronics Corporation, Oakland, Calif., a corporation of Nevada Filed Dec. 7, 1962, Ser. No. 243,116

9 Claims. (Cl. 343—5)

The present invention is directed to a signal conversion system, and more particularly to a novel conversion system which stores polar coordinate information which is provided by a rotating scanning device at one frequency, and reads out the stored information at a substantially different frequency for presentation on a rectangular raster of an indicator device.

Various radar systems have been employed to determine the distance and bearing of an object from a preassigned reference point, and to provide a display of such information on suitable display means, such as a cathode ray tube. One such presentation is commonly termed the plan position indicator (PPI) type presentation. The PPI presentation differs from other conventional types in that range and bearing information is displayed in a pattern using polar coordinates. In general, the antenna of the system is rotated at a uniform rate about a vertical axis, so that searching is accomplished in the horizontal plane. The radar beam is usually narrow in azimuth but broad in elevation.

Simultaneously with the scanning by the radar antenna, an unintensified spot is provided on the indicator by the display means for deflection from the center of the tube or indicator, along a radial line toward the edge of the tube. The direction (or radial line) along which the spot moves is related to the instantaneous bearing or azimuth of the antenna, and the spot movement along the radial line is related to the range information obtained by the radar system. When the spot reaches the edge of the tube face or indicator, retrace is quickly effected to displace the spot back to the center, and with the next transmission of energy from the antenna, another spot trace is commenced along a radial line displaced angularly from the last previous radial line in correspondence with the angular movement of the antenna between these two pulses. Thus as the antenna rotates, the path provided by the moving spot rotates around the center of the indicator screen so that the angle of the radial line on which the spot appears is related to the azimuth or bearing of the antenna beam. When a target-indicating echo is received at the antenna, the intensity of the spot on the indicator is substantially increased to indicate the detection of an object, the distance of the spot from the center of the indicator being related to the range. The persistency of the screen is normally such as to maintain the display at the energized point with decreasing brightness even after the scanning spot has progressed to other areas on the indicator. Accordingly, such a scan is useful to produce a map or display of objects in an area surrounding an airplane, vessel, observing station, or the like.

The PPI type of presentation has serious shortcomings in that rate of scan of the antenna is relatively slow, i.e., approximately 1 c.p.s. in many installations, and the brightness of each target-representing signal decays during the time interval required for the antenna to rotate through a full revolution and return to the same target bearing. As an aid to retention of the signal for such time periods, it is conventional practice in many systems to use a high persistence screen. However, such type screen requires that the display be viewed in a relatively darkened area, and in certain environments, such as in aircraft, it is frequently difficult to provide such conditions for viewing.

It is an object of the invention, therefore, to provide a device which is operable to display the information on indicator means which do not have the limitation of high persistence screens, and particularly, which is operable to provide a continuous display of the information on a display unit which may be viewed in ambient light conditions of a higher level.

It is a specific object of the present invention, therefore, to provide a device which is operable to reproduce the information in a polar coordinate pattern on a rectangular, raster-type display, and particularly to store the radar video information obtained at a first rate in a radial scan and identified by a first characteristic (polar coordinates $r$, $\theta$), for subsequent scanning or readout at a second rate by gating signals which control display of the information on a rectangular raster (Cartesion coordinates $x$, $y$) to there reproduce a polar coordinate type display on a television monitor.

To effect such storage and conversion with known equipment presently entails the use of units as large as 80" x 22" x 24", weighing as much as 500 pounds, and requiring a power input of the order of 1,000 watts. Moreover, a wiring arrangement of extreme complexity is required to effect the conversion between polar and rectangular coordinates. It is manifest that such requirements militate against the use of such a conversion unit in aircraft or other environments where physical size, weight, and energy requirements are at a premium.

It is therefore a primary object of this invention to provide a storage apparatus of a reduced size and weight which is capable of receiving PPI type radar video information, and storing such information for extremely long periods of time (of the order of years, if desired), without any degradation of the signal.

An important object of this invention is the provision of such storage apparatus which receives the input video information at a first rate related to the rate of the antenna rotation, and subsequently reads out the stored information at a different rate related to the scanning frequency of the raster on a display device without affecting the stored information content in any respect.

A salient object of the invention is the provision of a simple control means for regulating the unit to provide either an instantaneous display depicting the present position of each object, or an integrated display showing not only the instantaneous location of each object but also the path traversed by each object in reaching the position displayed at any given time.

The foregoing and other objects are realized, in one embodiment of the invention, by providing a storage unit for accepting and storing input video signals received from a radar set having a rotational scanning device which derives signals relating to the position of objects in a given relative area. The output signals of the radar means (which provide range and bearing information defined in polar coordinate terms) are coupled to a first grid or set of conductors which are arranged to represent the polar coordinate points in the scanned area. Storage elements are coupled to the conductors at different coordinate points of the grid and are effective to store the information for the correspondingly different points in the scanned area. Switching means couple the signal output of the radar to the grid conductors for storage on the storage elements in such manner at a frequency related to the rate of rotation of the antenna.

Readout means are provided for the purpose of effecting readout of the stored information for display on the rectangular raster of a display device, such as a cathode ray tube. The readout means includes a second group of conductors which are disposed in a crossed-grid pattern to define a plurality of $x$, $y$ coordinate points on the rectangular raster. Readout signals are applied over the conductors of the second grid to the storage means at a second frequency which is related to the frequency of the raster trace on the display device, and the signals stored on each of the storage means is reproduced at related positions on the rectangular raster of the display area. As a result, the information detected by the radar is presented in a polar coordinate pattern and the raster frequency of a cathode ray tube. For purposes of convenience, the display unit is depicted as a conventional cathode-ray tube, but those skilled in the art will recognize that the teachings of this invention are readily applicable to other types of known display devices including solid state units, gaseous display tubes, and the like.

An important aspect of the present invention is the presentation of either an instantaneous or an integrated display from a storage unit comprising magnetic-memory elements. That is, the information may be retained by a storage device for an indefinite period, and thus "read out" for presentation on each raster trace which occurs during the storage period. Alternatively the video information stored by a storage element may be erased immediately preceding the receipt of a new set of signals from the radar system for such storage element. More specific operating details of the various components of the system will be set out hereinafter.

The best mode contemplated for carrying out the invention will now be described. To enable those skilled in the art to make and use the invention, such description is set forth in connection with the accompanying drawings, in the several figures of which like reference numerals identify like elements, and in which:

FIGURE 1 is a block diagram, partly in schematic form, of one embodiment of the inventive system;

FIGURE 4 is a partial schematic diagram, partly in block form, showing certain of the apparatus utilized in conjunction with the layout depicted generally in FIGURE 3;

*Structure of the invention*

Figure 2:
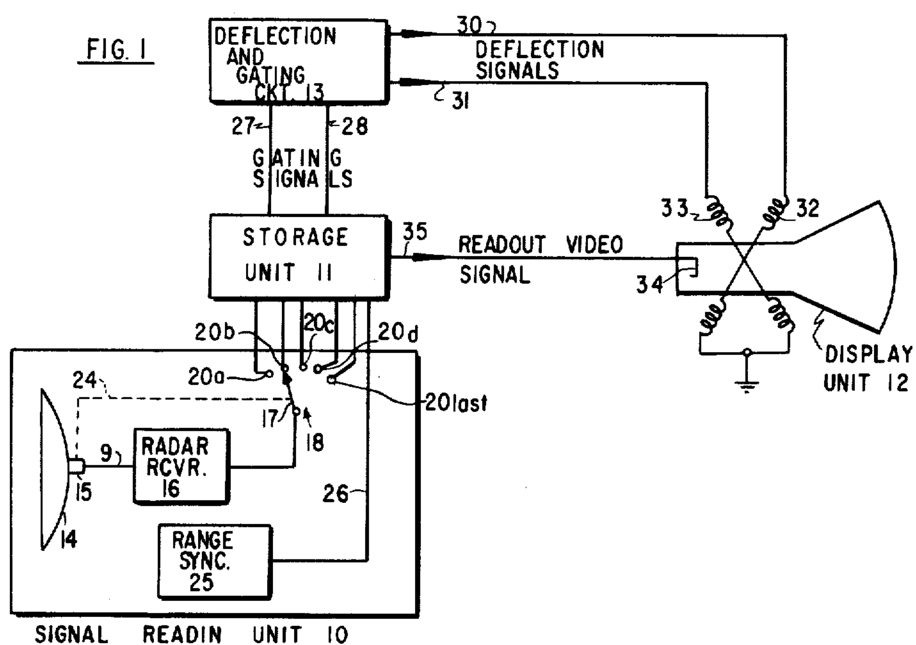
FIGURE 2 is an illustrative diagram useful in explaining the operation of a storage element.

The basic components of the novel system are depicted in FIGURE 1 and as there shown include a signal "readin" unit 10 for providing video signals related both to the range and bearing of an object from a reference point, a storage unit 11 for accepting and storing such information, a display unit 12 for depicting the stored information on a display arrangement adapted to provide a rectangular scan, and control circuitry 13 (which may include the deflection circuitry and sync circuits used in a conventional television set), for providing sync signals to effect the readout of information from storage unit 11 in synchronized relation with the provision of a raster or basic pattern on display unit 12.

More specifically, signal readin unit 10 includes an antenna 14 mounted for rotation on a shaft 15, and the signal output of the antenna is transmitted over a conductor 9 to the input stage of a radar receiver 16. The detected signal output from the receiver 16 is then sent over a movable switching arm 17 of a switch unit 18 and one of a plurality of fixed contacts **20*a*–20 last. Movable arm 17 is operated across the contacts 20*a*–20 last during the period that the antenna 14 operates through the sector to be scanned by the antenna. Mechanical synchronization or correlation between the instantaneous physical positions of antenna 14 and armature 17 is provided over a mechanical linkage 24**.

A range sync stage 25 provides synchronizing (sync) pulses related in time to the transmissions of the search pulse from the radar antenna, and the sync signal is transmitted over line 26 to storage unit 11 for range gating purposes.

Storage unit 11 is also coupled over lines 27 and 28 to the horizontal and vertical sync circuits of control circuit 13, and horizontal and vertical sync signals are applied to storage unit 11 by control circuit 13. Horizontal and vertical deflection signals are applied over conductors 30 and 31 to the horizontal and vertical deflection coils 32, 33 (or electromagnetic deflection plates, as the case may be) of display unit 12. The video output signals of storage unit 11 are transmitted over conductor 35 to the beam intensity modulating element 34 of display unit 12.

Storage unit 11 includes a matrix (described in more detail hereinafter) comprised of a plurality of magnetic memory storage elements, one of which is depicted in FIGURE 2 and referenced by numeral 36. Each storage element 36 includes a first (or readin) aperture *a* through which video input conductor 37 and range gate conductor 38 pass, a second (or readout) aperture *b* through which a horizontal gate conductor 40, a vertical gate conductor 41 and a video output conductor 42 are threaded, and a central (or erase) aperture *c* through which an erase conductor 43 passes.

Storage element 36 is a well known unit such as the type commercially available as a transfluxor ferrite core. The cores may be of different sizes, one of which is approximately ⅛ inch in diameter. Each core is connected to store information only with the simultaneous receipt at aperture *a* of a first pulse over video input line 37 from radar receiver 16, and a second pulse over range gate conductor 38 from range sync circuit 25. If a pulse appears on only one of these two lines, no information is stored. Inasmuch as each range gate pulse is always of the same amplitude, the information represented by the stored signal is related to the amplitude of the input signal received from the radar receiver 16 over video input or azimuth conductor 37.

The information thus read in or stored is retained by element 36 until a subsequent time when vertical and horizontal gating or readout pulses arrive simultaneously at aperture *b* over the horizontal and vertical gate conductors, such as illustrated conductor **40*f* and 41*c* respectively for element 36. With the coincident arrival of the horizontal and vertical readout pulses, a signal having a value related to the value of the stored information is transmitted over video output line 42. Notwithstanding such readout, the stored information is still retained by element 36 without any change or degradation of the value of the stored signal. No amount of readout over video output line 42 will affect the content or quality of the stored information, and the only way in which the stored information may be erased is by transmission of an erase pulse over erase conductor 43**.

*Storage matrix*

As indicated above, the storage elements 36 are arranged in a matrix, the nature of the matrix and the pattern of distribution of the elements 36 varying with the nature of the display to be provided. In the embodiment shown in FIGURE 3, the magnetic memory elements are arranged in a storage array comprised of radial and circular lines for the purpose of providing a PPI type display on a rectangular coordinate raster.

Although the storage elements are disposed in a circular matrix to facilitate the explanation of the invention, it will be apparent from the description hereinafter, that the connection of the conductors to the cores determines the pattern of signal readin and readout, and accordingly the actual physical disposition of the storage elements may be varied, as desired.

Figure 3:
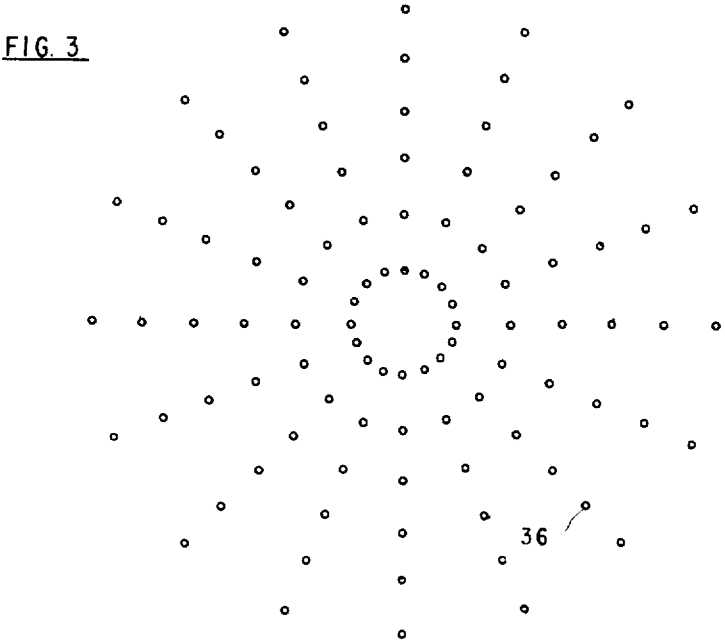
FIGURE 3 is an illustrative diagram showing a portion of one layout of storage elements.

Each circle, such as 36 in FIGURE 3, represents a storage element, such as shown in FIGURE 2, mounted on or in a suitable supporting structure (not shown). Although only a portion of the total number of elements 36 used in an operable unit are illustrated in FIGURES 3 and 4, those skilled in the art will recognize the facility with which the device can be expanded or contracted to any size. It will be further apparent that other forms of signal storage devices may be used in lieu of the magnetic storage elements shown herein.

In the present arrangement, the elements, such as 36, are located on and connected to a radial conductor, such as illustrated conductor 37, and a circular conductor, such as illustrated conductor 38. Each storage element, such as 36, is similarly connected to a radial conductor and a circular conductor to thereby define a discrete polar coordinate point in the matrix pattern which represents the information obtained in the rotational scan.

Each radial conductor thus represents an azimuth heading. A switch, such as switch 18 in FIGURE 1, is operative to select the radial conductor which represents the azimuth which is being scanned by the radar unit, and the information detected during the scan along such azimuth is distributed to the elements on such radial line to the exclusion of the elements in the other radial lines. Each circular conductor, such as 38, is selected in sequence as successive ranges along an azimuth are scanned, and in the event that the radar detects information at the corresponding position in the scanned area, a related signal is stored on the storage matrix at the element representing such range and azimuth.

Thus, by relating the radial lines, such as 37, to the azimuth direction of the antenna, and the successive storage elements, such as 36, in a radial line, such as 37, to the different ranges of the antenna sweep along each azimuth, each storage element represents a position expressed in polar coordinates in the area scanned by the radar system, and the information stored on such elements will be related to the conditions in the scanned area as detected by the radar unit.

It will be apparent, as noted above, that although a possible physical arrangement of the radial and circular configuration is depicted in FIGURE 3, the actual physical positions of the multiplicity of storage elements for a PPI presentation need not be in this form, but can be in any desired positions so long as the electrical intercoupling of the elements has a sense related to the radial and circular alignment of the elements as depicted in FIGURE 3, i.e., each storage element is connected to represent corresponding polar coordinates in the scanned area. In the following explanation, only a portion of the storage array is described, but it will be apparent from such disclosure as to the manner in which the remaining elements of the unit are connected and operated.

As shown in FIGURE 4, storage elements 21 and 22 (which are similar to storage element 36, FIGURE 2) are spaced apart and separated by other storage elements connected in a line to represent one azimuth heading in the system. The next illustrated radial ilne includes elements 46, 47 and 48, 59 and others, connected to represent another azimuth. Elements 50, 52 are identified in another radial line, elements 53, 36, 55, 69 in yet another, and elements 56 and 57 lie along another radial line, each of which represents a different azimuth heading in the area of section scanned by the radar system.

Storage elements 46, 50 and 53 are connected to a conductor 103 which represents a circular (or arcuate) path of coordinates in the polar coordinate system, each of which represents the same range relative to the position of the radar set. Elements 21, 47, 51, 36 and 56 are located along a second circular path of polar coordinates in such pattern, the elements 23, 48, 52, 55 and 57 are disposed along a further common arcuate path in such pattern, etc. The manner of intercoupling of the elements 36 on the matrix to represent polar coordinates in a scanned area is apparent therefrom. The manner in which the same elements are connected to represent coordinates on a rectangular pattern is described more fully after the following reference to the associated circuitry and the manner of storing the signals on the storage elements, such as 36.

Assuming, for example, that the radial conductor 37 including elements 53, 36, 55, 69, etc., is connected to represent 45 degrees azimuth, as the antenna 14 is operated to the azimuth heading 45 degrees (relative) in the scanned area or sector which is represented by radial line 37, movable arm 17 on switch 18 is operative to select contact **20*d* and radial conductor 37, whereby the signals received by the antenna 14 are coupled over receiver 16, conductor 61, movable arm 17, contact 20*d* of switch structure 18, and conductor 37**, which is threaded through the readin aperture *a* (FIGURE 2) of each memory element, such as 53, 36, 55, 69, etc., in the radial row including conductor 37 which is assigned to represent 45 degrees azimuth.

Conductor 26, which extends from range sync stage 25 in the readin unit, is coupled to the first range gate stage **95*a*, which is in turn coupled to range gate stages 95*b*, 95*c* and 95 last. Each of stages 95*a*–95 last is a conventional delay stage, similar to the horizontal and vertical delay stages. The range gates are respectively coupled over conductors 98, 99 and 100 to conductors 101, 38 and 103**, each of which extends through the *a* apertures of the elements in a different circular or arcuate path of the storage array.

According to one embodiment of the invention, an additional linkage 66 (FIGURE 4) is connected to shaft 15 of the antenna 14 to effect rotation of contact arm 67 of a switch structure 68 over a plurality of fixed contacts **70*a*–70 last at the speed of rotation of the antenna 14. Fixed contact 70*a* is coupled over conductor 74** through the central or erase aperatures *c* of the memory elements 49, 21–24 which are connected to conductor **20*a*. Although a detailed showing of the erase conductors has been omitted from FIGURE 4, the intercoupling and operation thereof will be apparent from the explanation given in connection with FIGURE 2. In an analogous manner conductors 75, 76, 43, 77 are connected to fixed contacts 70*b*–70** last and are threaded through the central apertures of the elements of successive ones of the radial lines in the storage array.

In effect, switch 68 is an erase switch, and is operative in selection of a contact, such as **70*a*, to complete an erase circuit for the storage elements on the radial line associated with the selected contact 70*a*–70 last. As switch 68 is operative to select contact 70*d*, current flows through the erase conductor 43 for the elements which are associated with readin conductor 37 to effectively erase or remove the stored information from all of the magnetic memory elements, such as 36, in the selected radial conductor 37. The elements are thus cleared to accept an incoming video signal and are operative to retain a signal until the next selection of erase conductor 43 for the elements 53, 36, 69, 55, etc., A second switch 78 is connected between ground and movable contact 67 of the erase switch to enable operation of the erase unit 68 (switch 78 closed, as indicated) or to disable the erasure switch 68 (switch 78** open) in which there is no erasure of the stored information.

*Readout circuitry for matrix*

As noted above, control circuitry 13 (FIGURE 1)

may be conventional sync circuitry and deflection circuitry of a commercial home television chassis, conductor 27 being connected to transmit sync pulses to storage unit 11 at the horizontal rate of the raster provided on display unit 12 and conductor 28 being operative to transmit sync pulses at the vertical rate to storage unit 11 in the readout of the signals on the storage elements 36, etc., to present the stored information in a polar coordinate pattern on the rectangular raster on display unit 12.

The readout means in storage unit 11 for effecting such manner of operation includes a plurality of horizontal delay stages 80*a*–80 last, which are connected to the horizontal sync conductor 27 of the control circuitry 13 for the display unit whereby gating signals are received from circuit 13 at the horizontal rate of the raster scan. Each of the horizontal delay stages 80*a*–80 last is connected over one of the "*y*" conductors 40*a*–40 last through the *b* apertures of the storage elements, such as 46, 49; 47, 22; 48, 24; 50, 52; etc., to ground, to define an "*x*" coordinate in each horizontal line in the rectangular raster, and is therefore connected through aperture *b* of each of said elements which represent such coordinate in the different lines in the rectangular raster. In a similar manner, a set of vertical delay stages 88*a*–88 last are provided to successively energize each of a plurality of horizontal conductors 41*a*–41 last, each of which conductors extends through each of a number of storage elements which are assigned to store information for display on the same vertical coordinate on the rectangular raster.

The mutually perpendicular set of conductors 40*a*–40 last and 41*a*–41 last thus define a grid, each crosspoint of which represents different coordinates on the rectangular raster, and each of the storage elements is connected to the *x-y* conductors for the one of such crosspoints which corresponds to the location in the rectangular display at which the polar coordinate information stored thereby is to be presented. Each storage device therefore represents predetermined coordinates in the polar coordinate pattern and predetermined coordinates in the rectangular or Cartesian pattern.

The horizontal delay circuits 80*a*–80 last are basically multivibrator circuits connected in a sequential pattern, the first of which is triggered each time a horizontal sync pulse is received over conductor 27. A predetermined time period thereafter (which period is determined by the time "*ht*" for a horizontal line scan divided by the number of horizontal delay circuits "*hn*" in the system) the first horizontal delay circuit 80*a* triggers the second horizontal delay circuit 80*b* and simultaneously transmits the pulse over its associated conductor, such as 40*a*, to the elements, such as 46 and 49, which have the same horizontal coordinate in the Cartesian coordinate grid. Each delay circuit in the sequence delays the gating pulse by a like period, and then triggers the subsequent delay circuit in the sequence until the entire set of delay circuits 80*a*–80 last has operated. As the next horizontal sync signal is received, the delay circuits 80*a*–80 last are once more triggered in sequence. A set of delay circuits so operative were disclosed in my copending application having Serial No. 126,436, which was filed July 13, 1961. Those skilled in the art will recognize that not only conventional delay stages can be utilized as delay stages 80*a*–80 last but other forms of delay techniques and structures may be employed including delay lines having successive taps or connections made thereto at the appropriate points for providing connections to successive conductors 40*a*–40 last.

The vertical delay stages 88*a*–88 last are similar to horizontal delay stages 80*a*–80 last. However in a raster scan the first vertical delay stage is triggered by the vertical gating or sync pulse, and the duration of the output pulse of each vertical delay stage is equal to the duration, at least, of the operating time of the horizontal delay circuits 80*a*–80 last. Stated in another manner the duration of the vertical gating or output pulse will be the same "*vt*" of the vertical trace divided by the number "*vn*" of vertical delay stages. The output gating signals of delay stages 88*a*, 88*b*, etc., are respectively coupled over conductors 41*a*–41 last, through the *b* or readout apertures in the storage elements which lie on the one of the horizontal conductors of the Cartesian coordinate grid associated with the vertical delay stage. It should be understood that although the illustrated gates are identified in sequence (i.e., 80*a*, 80*b* . . . 88*a*, 88*b* . . .) additional gates would be located therebetween to permit selection of additional coordinates in the system.

Thus with the application of the horizontal and vertical sync signals over conductors 27, 28, the readout circuits in storage unit 11 effects selection of the storage elements in a predetermined pattern consisting of readout, from left to right, of the storage elements in each row of the matrix, and readout of each row of elements in succession from the top to bottom row.

*Operation of the invention*

With reference to FIGURE 4, as antenna 14 rotates, the radar set is operative in a well known manner to send out energy in short bursts or pulses. The reflected energy or echo signal is received at antenna 14, detected in the receiver 16, and transmitted over conductor 61 to movable arm 17 of video distribution switch 18. The instantaneous position of arm 17 is synchronized with the instantaneous position of antenna 14. As shown, the radar antenna is scanning at the 45 degree azimuth, and the signals detected by radar receiver 16 are being amplified and transmitted over conductor 61, selector arm 17 of switch 18, fixed contact 20*d* and over conductor 37 through the *a* or storage aperture of each of the storage elements 55, 69, 36 and 53 which are in the radial line assigned to represent the 45 degree azimuth on the storage device. A range sync pulse is generated by range sync stage 25 in time coincidence with the transmission of each pulse by the radar transmitter, and such pulse is applied to the set of range gates 95*a*–95 last to trigger the operation thereof. The range gates 95*a*–95 last operate in sequence, the time of operation of the successive gates being related to the resolution of the system. Thus assuming the first range gate 95*a* is assigned to mark ranges from 0 to 200 yards, the gate will be operative for the time subsequent to receipt of a sync pulse from range sync stage 25 which is required for the pulse to travel from the transmitter to an object located at 200 yards and to be reflected by such object and detected by the radar receiver 16. During such period the pulse output of range gate 95*a* will energize its associated conductor 98.

With the elapse of such time period, the range gate 95*a* triggers the range gate 95*b*. Assuming range gate 95*b* is assigned to mark ranges from 200–400 yards, range gate 95*b* will be operative for the period required for a transmitted pulse to be reflected by an object at such range and to be detected by radar receiver 16, and its associated range conductor 99 (which is coupled to conductor 38) will be energized for such period.

As noted above, the range gate conductor, such as 38, for a range gating stage, such as 95*b*, is threaded through the "*a*" apertures for each storage element, such as 36, which is assigned to represent such range in the different azimuths.

Since only one of the range gates is enabled at any one time, only one circular path of storage elements, such as the elements coupled to vertical conductor 38, will be enabled by a range gate pulse. Assuming antenna 14 is at the 45 degree azimuth of its scan, only a radial conductor 37 of the radial conductor will be energized, and as range gate 95*b* operates, a signal will be stored only in storage element 36, such storage being effected by reason of the concomitant receipt, at the readin or input aperture "*a*" of element 36 of a pulse over conductor 37 and a range gate pulse over conductor 38.

Movable contact 67 of erase switch 68 is also being rotated by linkage 66, in timed relation with the antenna 14. In the position illustrated, a circuit is completed from ground over mode switch 78, movable contact 67, fixed contact 70 last and conductor 77 through the erase aperture *c* of each of storage elements 56 and 57, to a source of unidirectional operating potential (not shown). In this position current flows over the circuit just described and effects the erasure or removal of information, from each of the elements 56, 57, etc. Assuming the antenna 14 is rotating in a clockwise direction, and the movable arms 17 and 67 are each being rotated in a like direction, it is evident that the rotation of the movable arm 67 of the erase switch ahead of the rotation of the movable arm 17 of the video distribution switch effects erasure of the information stored on each radial line of elements to condition same for receipt of input video information as the arm 17 is moved into contact therewith. This operation is provided in the instantaneous display mode of operation of the system. Switch 78 is opened when an integrated display is desired as will be described subsequently in connection with FIGURES 5A–5C and 6.

At this juncture signals have been stored in those storage elements corresponding, by reason of electrical circuit connections, to the polar coordinates representative of the range and bearing information for objects located in the scanned area. In accordance with an important aspect of the invention, the individual storage elements of an array are sequentially interrogated by the simultaneous receipt at the *b* aperture of a pair of gating signals to provide a readout of the stored signals. As noted heretofore, each element represents a location expressed in Cartesian coordinates which correspond to the Cartesian coordinates of the raster scan at such time. The video signals thus read out are presented as a PPI display on the rectangular raster of a television monitor. However, because the signals are read out and presented on display unit 12 at the television deflection frequencies, the target-representing spots on the indicator do not diminish perceptibly in brightness (or disappear entirely) as occurs in conventional PPI systems during the antenna rotation interval. This enhanced and constant brightness is an important advantage of the invention.

Considering now the information readout in an instantaneous display and referring to FIGURE 4, it is assumed that at a given moment a delayed horizontal gating pulse is being applied from delay stage **80*f*, and over conductor 40*f*** through the *b* or readout aperture of each of the storage elements, such as 36. At the same moment, it is assumed that a delayed vertical gating pulse is being supplied from vertical delay stage **88*c* over conductor 41*c*** through the *b* or readout apertures of each of the cores, such as 36, 47, etc. Thus, with the concomitant arrival of the horizontal and vertical gating pulses at the readout aperture of storage element 36, a signal related in amplitude to the stored information is transmitted over conductor 42 (FIGURE 2), conductor 35 (FIGURE 1) to the input or modulating element of display unit 12. Inasmuch as the same horizontal and vertical sync signals which appear on conductors 27 and 28 are also utilized to govern the production of the deflection signals for the display unit, as explained previously in connection with FIGURE 1, the video signal presented over conductor 35 will be displayed on unit 12 at a related position on the raster, and since the original information received at antenna 14 is stored in terms of polar coordinates, the signals as displayed will reproduce the polar coordinate information stored on the matrix. It is thus evident that the inventive structure provides a simple and readily constructed array which effects both storage and display of signals having a first characteristic, such as information represented in polar coordinates by utilizing gating signals having a second characteristic, that of Cartesian or rectangular coordinates, to reproduce such information on a rectangular raster.

The instantaneous display mode is attained with the mode switch 78 in the position indicated in FIGURE 4. That is, with a moving target or object at a first position, the display depicts the target as a dot designated by numeral 107 in FIGURE 5A. During the next traversal of the erase switch past the radial line including the element in which the target information is stored, this information will be removed as explained hereinbefore. In the scanning display, the target will appear in a different position as reference by 108 in FIGURE 5B, and still later, the moving target will be displayed at another location 109 (FIGURE 5C) nearer the edge of the display. Thus, at the time of the display in FIGURE 5C, the only information available to a viewer is that the target is now at the location referenced by numeral 109, i.e., an instantaneous showing of the position of the object.

Figure 5A:
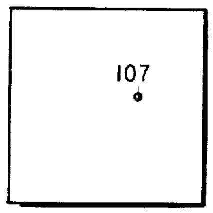
FIGURES 5A–5C and 6 are illustrative showings useful in explaining the operation of the invention.
Figure 5B:
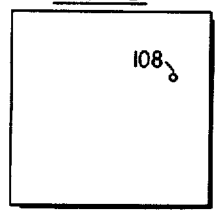
Figure 5C:
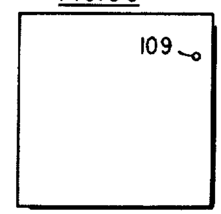
Figure 6:
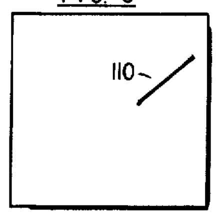
Figure 7:
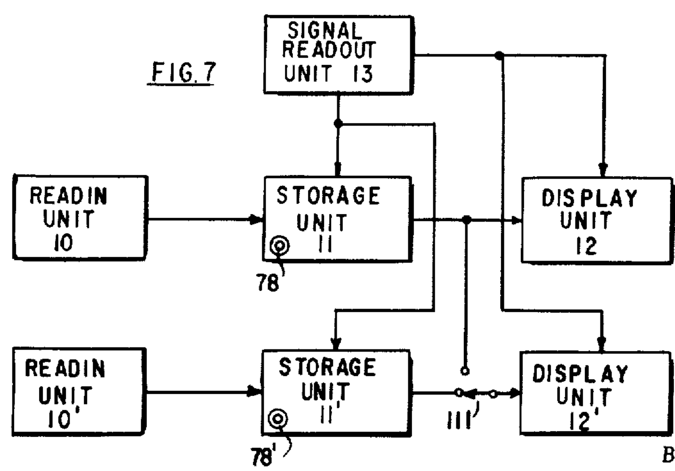
FIGURE 7 is a block diagram depicting another system in which the inventive device finds utility.

In accordance with the inventive teaching, mode switch 78 can be displaced to the open position to interrupt the erase circuit. In the integrated display thus afforded, each magnetic storage element retains the information received over the video distribution switch 18. By way of example, at the same time that an instantaneous display, such as that illustrated in FIGURE 5C, is provided, the integrated display referenced by line 110 in FIGURE 6 would be presented from a different storage array with the mode switch in the open (or integrated) position. Thus an indication of the path of the object with respect to the center of the display is afforded. It is manifest that it may be desirable to include two displays, one instantaneous and one integrated, to provide a positive determination as to which end of the track the object is located at when the integrated display is viewed. Such information could be gathered from dual display, as portrayed in FIGURE 7.

As there shown, two storage units 11 and 11′ are respectively coupled to readin units 10 and 10′ for the simultaneous receipt of video input information from the readin units. Storage unit 11 includes a mode switch 78, and unit 11′ likewise comprises a mode switch 78′. Each of the storage units is controlled for readout by signals received from a single readout unit 13, but the video output signals are respectively applied to display units 12 and 12′ as indicated.

Accordingly, with mode switch 78 providing an instantaneous display on unit 12 and storage unit 11′ having the mode switch 78′ in the open position to provide an integrated display on unit 12′, an operator of a vessel or aircraft can readily discern not only the instantaneous position of an object, but also the course or path of such object with respect to his own location. This is a highly desirable feature which is readily provided by utilizing the inventive teaching. Alternatively, one display unit can be removed and a single selection switch 111 utilized in the position indicated, to provide either an instantaneous display (e.g., from storage unit 11) or an integrated display (from storage unit 11′). The information stored in the various units can likewise be of different natures. For example, at an airport a different storage unit could be utilized to store information of all the aircraft at each specific altitude. A single controller can then manipulate one selection switch to rapidly view all of the aircraft stacked at a given location at or adjacent the airport. Because of the flexibility of the structure of the invention and its ready adaptation to existing electronic components, the utility of the invention is very wide indeed.

While only particular embodiments of the invention have been described and illustrated, it is apparent that modifications and alterations may be made therein. It is therefore the intention in the appended claims to cover all such modifications and alterations as may fall within the true spirit and scope of the invention.

What is claimed is:

1. In an information storage and display system comprising a display device for depicting information thereon, a storage matrix including a plurality of storage means, each of which is operative to store signals therein, selection means including means operative in a first condition to effect periodic storage of signals on said storage means, switching means associated with said storage matrix for selecting each of said storage means to effect derivation of a signal therefrom without disturbing the stored signal including means for coupling the derived signals to said display device, and an erase means operative to remove the information stored in each storage element prior to storage of a further signal thereon to thus produce an instantaneous type presentation on said display device.

2. A system as set forth in claim 1 in which said erase means includes means for disabling said erase means to thus produce a continuous presentation of the path of a moving object on said display device.

3. In an information storage and display system, a display device for displaying received information in a visual presentation, a storage matrix comprising a plurality of storage elements for storing information-bearing signals, readout means including conductor means associated with said storage elements for deriving signals from said storage elements for display on said display device without disturbing the stored signal, and switching means operable in a first position to complete a given circuit periodically to pass current through said electrically conductive means to effect periodic removal of information from said matrix, and operable in a second position to interrupt said given circuit to effect retention of the information by said matrix during successive displays to provide an integrated display on said display device.

4. An information storage and conversion system comprising a first storage matrix for receiving and storing a first set of information expressed in polar coordinates, a second storage matrix for receiving and storing a second set of information expressed in polar coordinates, display means including means for providing a rectangular raster and means for presenting at least one of said information sets on said raster, control means for correlating the transfer of information from said storage matrices to said display means, and switching means coupled to said display means for selecting an alternative one of said first and second information sets for presentation on said display means.

5. An information storage and conversion system comprising at least first and second storage matrices, each having a plurality of storage elements with first circuit means assigned to mark each element as representing a preassigned location in terms of polar coordinates, and second circuit means assigned to mark said element as representing said preassigned location as expressed in terms of rectangular coordinates, means for applying information expressed in polar coordinates to said first circuit means of each matrix for storage therein, a display device including means for presenting a rectangular coordinate raster display, and modulation means for varying the presentation on the raster, control circuitry for applying rectangular coordinate gating pulses to said second circuit means of each matrix to effect information readout in timed relation to the presentation of said raster on the display device, and switching means for transferring the information read out from one of said matrices to said modulation means of the display device.

6. An information storage and conversion system as set forth in claim 5 in which at least one of said storage matrices includes mode switching means for effecting either retention of the received information or periodic removal of the received information.

7. An information storage and conversion system comprising at least first and second storage matrices, each having a plurality of storage elements with first circuit means assigned to mark each element as representing a preassigned location in terms of polar coordinates, and second circuit means assigned to mark said element as representing said preassigned location as expressed in terms of rectangular coordinates, means for applying information expressed in polar coordinates to said first circuit means of each matrix for storage therein, a pair of display devices, each having means for developing a rectangular coordinate raster display thereon, and modulation means for varying the presentation on the raster, the modulation means being respectively intercoupled with output circuits of said matrices, and control circuitry for applying rectangular coordinate gating pulses to the second circuit means of each matrix to provide video information over said output circuit in timed relation with the development of said raster on each display device.

8. In an information storage and display system in which range and bearing information is supplied in polar coordinate form for ultimate presentation on a display unit, a storage matrix having a plurality of storage elements, a first set of electrically conductive members disposed in radial lines and circular lines for receiving bearing and range information, switching means coupled to said storage matrix for sequentially transferring bearing information to the elements disposed along the respective radial lines of the storage matrix, gating means coupled to said storage matrix for sequentially transferring range information to the elements disposed along corresponding circular lines of the storage matrix, a second set of electrically conductive members disposed in a rectangular coordinate pattern to receive respective horizontal gating pulses and vertical gating pulses in timed relation with the provision of a rectangular coordinate display on said display unit including means for coupling each storage element to a different pair of the horizontal and vertical conductors in said pattern, readout control means coupled to said second set of electrically conductive members and to said display unit for effecting readout of the stored information in timed relation with the provision of the rectangular coordinate presentation on said display unit, erase means for selectively removing the stored information from each element in the storage matrix prior to the coupling of further information to the element, and means for disabling said erase means to retain the stored information as further information is received for storage thereon to thus provide an integrated type display on said display unit.

9. In a signal conversion system including a matrix of storage elements, each element having a plurality of control means, a plurality of rectangular coordinate signal conductors comprising a group of horizontal conductor members and a group of vertical conductor members, each intersection of a vertical and a horizontal conductor defining a coordinate point in a rectangular coordinate pattern, and a second plurality of signal conductor sets including polar conductor members connected to define a plurality of points in a polar coordinate pattern, each of said storage elements having at least one control means electrically coupled to a pair of polar conductor members which define a coordinate point in said polar coordinate pattern, said pair of polar conductor members and said control means being connected to store a signal on said storage element responsive to simultaneous energization of said pair of polar conductor members, and at least one control means electrically coupled to a pair of rectangular conductor members which define a coordinate in said rectangular coordinate pattern, said pair of rectangular conductor members being connected to said storage elements to repeatedly derive a signal related in value to the signal stored on the element without materially altering the value of the signal stored thereon, and switching means connected to and operative with said group of horizontal and vertical conductor members to effect repeated energization of said horizontal and vertical conductors in the derivation of the signal selectively from each of said storage means without change to the stored signal, and means for coupling the derived signals to said display device.

References Cited by the Examiner

UNITED STATES PATENTS

| | | | |
|---|---|---|---|
| 2,655,650 | 10/1953 | Marshall | 343—11 |
| 2,753,552 | 7/1956 | Hom | 343—11 |
| 2,774,964 | 12/1956 | Baker et al. | 343—7.3 |
| 2,918,655 | 12/1959 | Pulvari | 340—174 |
| 2,920,312 | 1/1960 | Gordon et al. | 340—174 |
| 2,931,022 | 3/1960 | Triest | 340—174 |
| 3,114,908 | 12/1963 | Hall | 343—11 |
| 3,147,474 | 9/1964 | Kliman | 343—10 X |

FOREIGN PATENTS

| | | |
|---|---|---|
| 1,080,159 | 4/1960 | Germany. |
| 882,905 | 11/1961 | Great Britain. |

CHESTER L. JUSTUS, *Primary Examiner.*